UNITED STATES PATENT OFFICE.

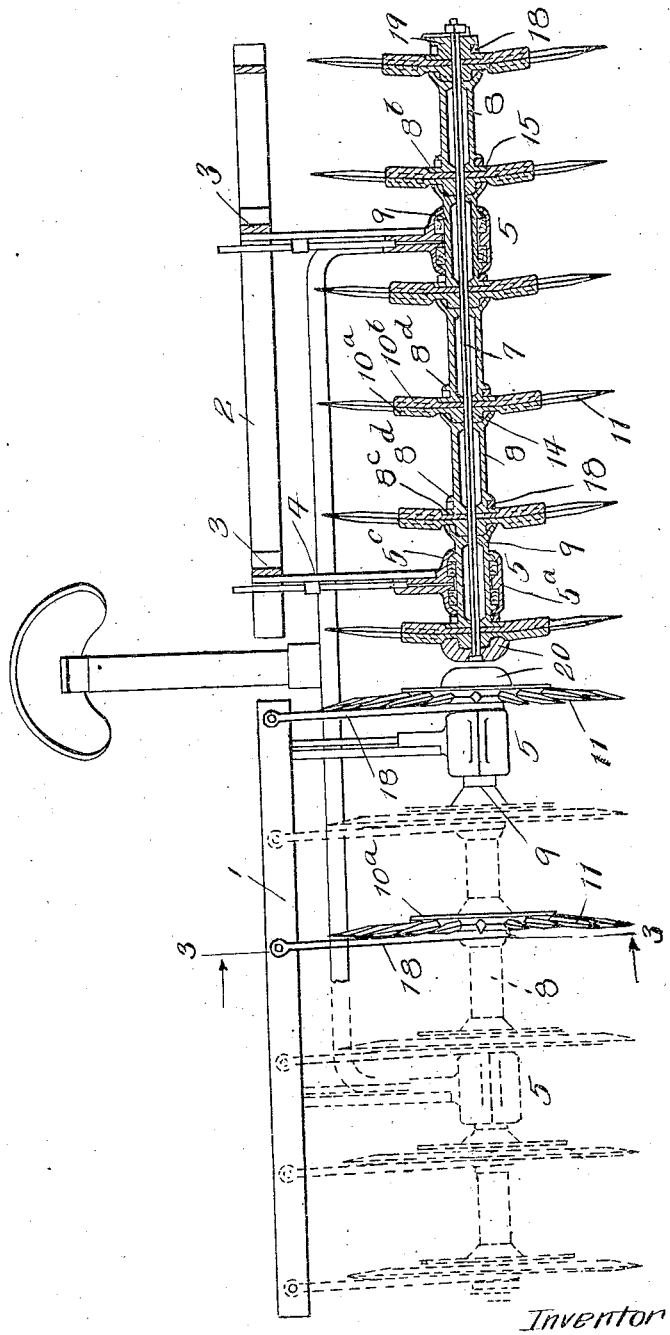

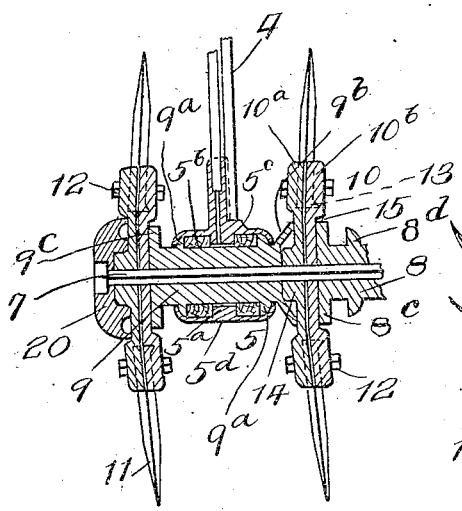
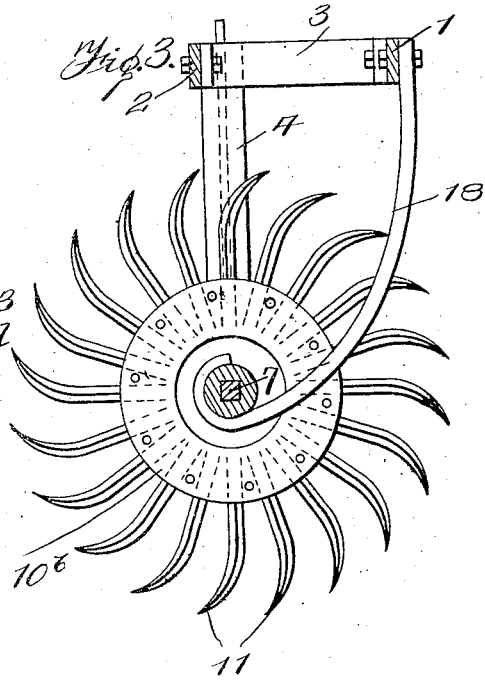
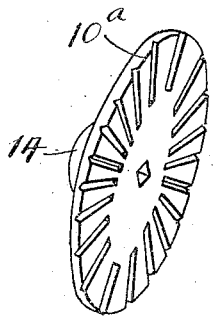
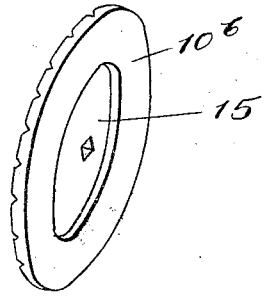

CHARLES E. WHITE, OF MOLINE, ILLINOIS, ASSIGNOR TO DEERE & MANSUR COMPANY, A CORPORATION OF ILLINOIS.

HARROW.

951,227.  Specification of Letters Patent.  Patented Mar. 8, 1910.

Application filed May 29, 1908. Serial No. 435,829.

*To all whom it may concern:*

Be it known that I, CHARLES E. WHITE, a citizen of the United States, residing at Moline, in the county of Rock Island and State of Illinois, have invented certain new and useful Improvements in Harrows, of which the following is a specification, reference being had therein to the accompanying drawing.

This invention relates to harrows which are adapted for the renovation of alfalfa, or other crops of a similar character. In implements of this character use is made of disks with outwardly extending spike teeth. These toothed disks or heads are arranged in gangs and roll over the ground in much the same manner as do the disks of the ordinary disk harrow, their action, however, being quite different.

The object of my invention is to improve the construction of the heads and also the method of mounting the heads and the scraper bars with which the heads are provided.

In the accompanying drawing, which illustrates a practical embodiment of my invention, Figure 1 is a rear elevation of the harrow, the right gang of tools being shown in section. Fig. 2 is an enlarged vertical sectional view of two of the inner heads of one of the gangs. Fig. 3 is a sectional view of one of the gangs, the section being taken on line 3—3 in Fig. 1. Fig. 4 is a perspective view showing the two disk plates of one of the heads separated from each other.

The frame of the implement is preferably of the disk harrow type in which two gang frames are pivotally connected to the draft bars, and are provided with means to effect their angular adjustment in relation to the line of draft. Inasmuch as this type of frame is well known, I have shown in the drawings only the main frame parts directly associated with the tool gangs.

Each of the gang frames comprises transverse bars 1 and 2 which are united by angle bars 3. Depending bars 4 are secured to the bars 3 and at their lower ends carry the bearing boxes 5, 5 of the tool gangs.

Each tool gang comprises a plurality of toothed disks which are mounted on a gang bolt 7, and maintained in suitable spaced relation by spools 8, 9. The spacing spools 9 are specially constructed to receive the bearing boxes 5, being formed with outturned flanges 9$^a$ between which and a central flange 5$^a$ of the boxes are mounted wooden bearing rings 5$^b$. The bearing boxes are preferably formed in two parts 5$^c$ and 5$^d$, the former having an up-standing extension to which the depending bar 4 is bolted.

Each of the toothed heads comprises a main disk part 10 made up of the two plates 10$^a$, 10$^b$. Each of these plates has a thickened peripheral part on the inner face of which a series of grooves are formed to receive the square spiked teeth 11, the thickened peripheral parts of the disk plates being preferably dished so as to give the teeth an outward cant as is clearly shown in the drawing. In addition to this outward cant, the teeth are preferably curved backward with respect to their direction of rotation for a purpose presently to be described. The teeth are rigidly secured in position between the two disk plates by means of clamping bolts 12, and are preferably disposed cornerwise as shown, the grooves in the plates being correspondingly formed. To prevent lengthwise displacement, each tooth is formed with an offset at its inner end which engages a notch in the disk grooves as shown at 13.

The disk plate 10$^a$ has a hub 14 formed on its outer face. The other disk plate, 10$^b$, has its central part left plain, and by reason of the thickened peripheral part there is formed a central depression 15 designed to receive the flanged end of one of the spacing spools 8, 9. Each of these spacing spools is formed at one end with a flange 8$^b$, or 9$^b$, that extends axially outward so as to embrace the hub 14 of the adjacent disk. At its other end, the spool is formed with an outwardly extending flange 8$^c$, or 9$^c$ adapted to be received in the depression 15 of the other adjacent disk, the thickness of the flange 8$^c$ being such that its inner face lies approximately flush with the adjacent face of the disk. Each of the spools 8 in addition to the flanges 8$^b$, 8$^c$ is formed with a collar 8$^d$ which coöperates with the flange 8$^c$ to prevent the lateral displacement of the scraper bar 18 with which each head is provided.

Each of the scraper bars 18 is secured at its upper end to the transverse bar 1 of the gang frame, and at its lower end is bent partially around one of the spacing spools between the flange 8$^c$ and collar 8$^d$ of the latter. Thus mounted, each of the scraper bars is securely held closely adjacent the plane face of its toothed disk. The construction is varied in the case of the spools 9, one end of the bearing boxes 5 serving as a retaining abutment for the lower end of the scraper bar, in place of the collar 8ᵃ of the spools 8. Also, in the case of the outside scraper bars, a flanged collar 19 serves to hold the lower end of the bar against lateral displacement. The inner head of each gang carries a bumper 20 secured in position by the gang bolt in the usual way.

With the tool gang thus constructed and mounted, it will be seen that as the implement is moved over the ground, the heads, spacing spools and gang bolt of each gang rotate in unison as in the case of the disk harrow.

The scraper bars 18 are preferably curved as shown in Fig. 5. This form of the scraper bar in connection with the backward curvature of the teeth 11, previously referred to, insures a very effective cleaning of the latter for it will be seen that sods and trash of any sort that may be picked up by the teeth are forced outward along the lines of the teeth as they rise adjacent the scraper bars.

It will be observed that in the construction of the heads and spacing spools, as above set forth, the flanged ends of the spools have a very wide bearing against the opposite faces of the heads. This greatly stiffens the gang of tools as a whole and I consider it a feature of considerable practical importance.

What I claim is:

1. In an implement of the class set forth, the combination of the gang frame, the gang bolt or axle, the series of spike toothed disks on said bolt, each disk having in one face a central depression, the series of spacing spools interposed between the disks, each spool having at one end a flange adapted to enter the central depression of the adjacent disk and, spaced inward from said flange, a collar, and the series of scraper bars, each having its upper end secured to the frame and its lower end bent around a spacing spool between the aforesaid flange and collar thereof.

2. In an implement of the class set forth, the combination of the gang frame, the gang bolt or axle, the series of toothed heads, each comprising the disk plates 10ᵃ, 10ᵇ and the teeth 11 secured between said plates, the plate 10ᵇ having a central depression in its outer face, the series of spacing spools interposed between the disks, each spool having at one end a flange adapted to enter the central depression of the adjacent disk and, spaced inward from said flange, a collar, and the series of scraper bars, each having its upper end secured to the frame and its lower end bent around a spacing spool between the aforesaid flange and collar thereof.

3. In an implement of the class set forth, the combination of the frame, the axle carried by the frame, the toothed head mounted on the axle and comprising a disk and a plurality of backwardly curved spike teeth extending radially from the disk, and the scraper bar secured to the frame and disposed adjacent one side of the head to coöperate with the teeth.

4. In an implement of the class set forth, the combination of the gang frame, the gang bolt or axle, carried by the frame, the spaced series of toothed heads on said gang bolt, each head comprising a disk and a plurality of backwardly curved axially canted spike teeth extending radially from the disk, and a plurality of scraper bars carried by the frame, one adjacent each head to coöperate with the teeth thereof.

5. In an implement of the class set forth, the combination of the gang frame, the gang bolt or axle carried by the frame, the series of toothed heads on said gang bolt, each head comprising a disk having a laterally extending hub flange and a plurality of spike teeth extending radially from the disk, and a series of spacing spools interposed between said heads, said spools having wide flanges to form a wide bearing against the faces of the said disks and one of the flanges of each spool being extended axially and outwardly to embrace the hub flange of the adjacent head.

In testimony whereof I affix my signature, in presence of two witnesses.

CHARLES E. WHITE

Witnesses:
N. A. PETERSON,
J. V. LOCKHART.